Sept. 20, 1949.  C. W. BURNHAM  2,482,243
INJECTION MOLDING DEVICE WITH
SELF-BINDING SEPARATOR
Filed May 5, 1947
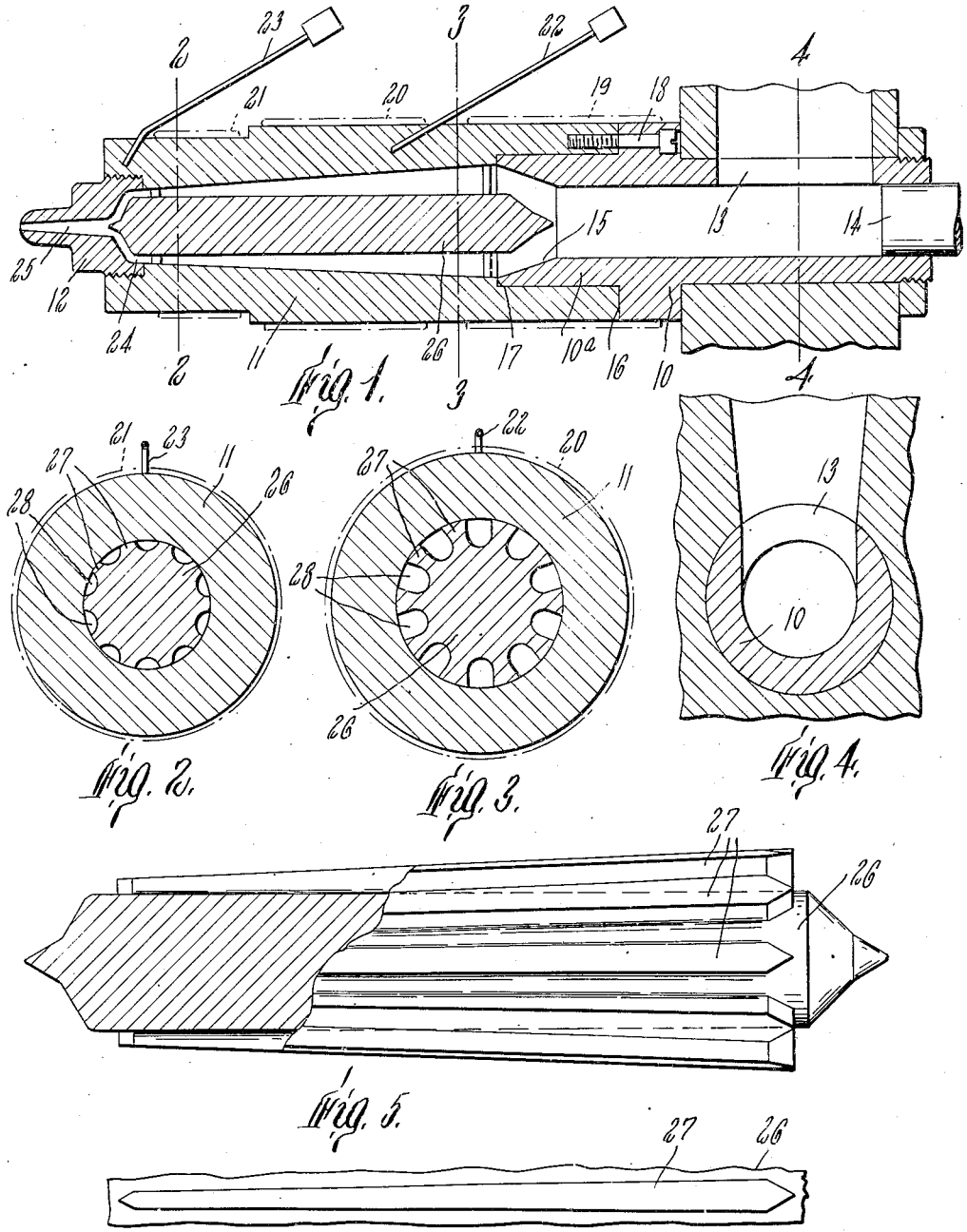
INVENTOR.
Clarence W. Burnham
BY Wright, Brown, Quinby
thray
Attys.

Patented Sept. 20, 1949

2,482,243

UNITED STATES PATENT OFFICE 2,482,243

INJECTION MOLDING DEVICE WITH SELF-BINDING SEPARATOR

Clarence W. Burnham, Springfield, Vt., assignor to The Fellows Gear Shaper Company, Springfield, Vt., a corporation of Vermont Application May 5, 1947, Serial No. 746,052

6 Claims. (Cl. 18—30)

1

The present invention relates to apparatus and devices for molding plastic materials, such as artificial resins, by which the material in granular form is forced into a heating chamber, where it is converted into a continuous semi-liquid body and from which it is extruded into molds. The heating chambers of such devices are commonly arranged to receive heat from an external source and are provided with internal separators arranged to spread the plastic into contact with the walls of the chamber and to conduct heat from such walls through the annular body of plastic formed by the separator, and into the interior thereof.

In the use of devices of this character, it has been noted that often the separators become displaced allowing the semi-fluid plastic to enter narrow spaces between the walls of the heating chamber and the abutting parts of the separator, being entrapped and becoming excessively heated so that it is more or less burned and darkened in color, thereby causing discoloration of the plastic which is injected into the mold. It is my object to prevent such sticking or stagnancy and burning of the plastic. This object I have accomplished by providing an improved separator and a novel combination thereof with the heating chamber of a plastic molding device, whereby the separator is held firmly in place and no opportunity is afforded for entrapment of the plastic. One form of such improved separator in combination with a heating chamber is shown for illustration in the accompanying drawings and described in the following specification. The invention consists in such improved separator and combination and all equivalent variations or modifications thereof.

In the drawings,

Fig. 1 is an axial section of a plastic conditioning device having an internal separator embodying this invention;

Figs. 2, 3 and 4 are cross sections on lines 2—2, 3—3 and 4—4, respectively, of Fig. 1 and represented on a somewhat enlarged scale;

Fig. 5 is a side elevation and partial section of the separator shown in Figs. 1, 2 and 3;

Fig. 6 is a face view of one of the fins of the separator.

Like reference characters designate the same parts wherever they occur in all the figures.

The plasticizing device comprises a cylinder 10, a heating chamber 11 in tandem therewith, and a nozzle 12 at the remote end of the heating chamber from the cylinder. The cylinder is mounted on any suitable supporting structure and in the upper side thereof is an inlet port 13 in communication with the outlet of a hopper or other container in which granular plastic is stored. A piston 14 is mounted to reciprocate in the cylinder across the port 13 toward and away from the heating chamber. The bore of the cylinder is formed with a flaring zone 15 at its outlet end.

The heating chamber 11 is a tubular member counterbored at one end to fit over the outlet end portion 10a of the cylinder. It abuts at its end against an external shoulder 16 of the cylinder and has an internal shoulder 17 against which the extremity of the cylinder abuts. It is secured to the cylinder by bolts 18. Its other end is counterbored and internally threaded to mate with external threads on the nozzle 12. The chamber is heated by any suitable means, one type of such means being represented diagrammatically in Fig. 1 as electrical resistance coils or bands 19, 20 and 21, surrounding the heating chamber in different zones of its length, including the part which overlaps the cylinder 12. Temperature indicators 22 and 23 are inserted into the side of the heating chamber at points near its mid length and its discharge end. These may be thermocouples or temperature measuring instruments of any other suitable kind.

The bore of the heating chamber is tapered with diminishing diameter from the shoulder 17, where it is equal in diameter to the large end of the flaring zone 15 and registers therewith, to the shoulder at the bottom of the recess into which the base of nozzle 12 is inserted. The nozzle has an entrance space 24 equal in diameter to the smaller end of the bore of the heating chamber, the bounding surfaces of which converge with a steep taper to smoothly curved junction with the walls of a gradually tapered bore 25 leading to the emission orifice of the nozzle.

A separator 26 is mounted coaxially in the heating chamber. This separator is formed with radial fins 27, the external surfaces of which are segments of a conical surface complemental to the tapered bore of the heating chamber. Between the fins are channels 28, the bottoms of all of which are equidistant from the axis of the separator. In effect the bottoms of the channels are tangent to the surface of an imaginary cylinder, or may be formed as segments of a cylindrical surface. The portion of the separator bounded by such imaginary or actual cylindrical surface may be considered as a cylinder and may be called the core portion of the separator. The length of the fins is approximately or nearly equal to the length of the tapered bore of the heating chamber and their ends are near the corresponding ends of the bore. But the ends of the core portion extend beyond the ends of the fins into the flared zone 15 of the cylinder and the entrance recess 24 of the nozzle, but terminate short of the bounding walls thereof. These ends of the core portion are tapered at angles generally similar to the tapers of the zone 15 and cavity 24, respectively, to facilitate flow of the plastic material and prevent any of the material being held stationary at either end of the separator. For the same purpose the opposite ends of the fins 27 are beveled to V shape, as shown by Figs. 5 and 6, or other suitable streamlined form. The sides of the fins also are tapered with diminishing width from the beveled extremity at the large diameter end of the separator to the bevel at the opposite extremity; and this taper also facilitates flow of the plastic.

The complemental taper of the separator ribs and internal walls of the chamber is an important factor of the invention. It is what is commonly called a "sticking" taper; that is, one of such small included angle that the separator is self-binding in the chamber when thrust therein under only moderate force, and is held so strongly that it can be dislodged only by exertion of relatively great force or by a sudden impact. To obtain this sticking or binding effect, the taper should be not more than 15° included angle, although it may vary somewhat according to the materials of which these parts are made. In the present illustration, the included angle is much less than 15°.

Due to the sticking taper, the pressure exerted by the piston on the separator through the material acted on forces the separator ever more firmly into the chamber, and insures that it will not come loose. The binding effect prevents the separator from following the piston under the viscous pull of the plastic and the suction effect when the piston withdraws.

In cross section the outer surfaces of the fins are truly circular. These surfaces intersect with the sides of the intermediate channels on sharp edges and they bear on the interior surface of the chamber at all points between such edges. The sides of each channel are preferably parallel to each other in cross section, as indicated in Fig. 3, although they may be radial to the axis of the separator, or the fins may be parallel sided in cross section. Consequently the fins fit accurately and bear closely on the walls of the chamber, leaving no spaces or crevices in which the plastic may lodge and remain to be overheated and discolored.

Due to the cylindrical character of the core portion and the conical exterior of the fins, the channels 28 are of progressively diminishing depth (consequently of diminishing transverse area) from the entrance end of the heating chamber to the discharge end. This difference of depth at points near the ends of the channels is very strikingly shown by Figs. 2 and 3. When the grains of solid plastic become softened and fluid by heat, they are deformed so as to fill the voids between them and merge together, whereby the over all bulk of the plastic is diminished. The diminishing area of channels 28 corresponds to the diminishing bulk of the plastic.

By forming the heating chamber and separator so that the greatest height and thickness of the fins is at the entrance end of the chamber, where customarily the greatest amount of heat is applied, heat from the walls of the chamber is efficiently conducted by the fins and core of the separator through the annular mass of plastic and into the interior thereof. This greatly aids in plasticizing and fusing the material.

The novel features of the invention hereinbefore described contribute to greater efficiency in softening solid plastic, preventing burning or discoloration of the plastic, and facilitating flow of the plastic and emergence in fluid condition from the orifice of the nozzle.

What I claim is:

1. In an injection molding device, a heating chamber having a bore therein, a separator in said chamber having a tapered outer surface, the included angle of said outer surface being less than 15° and said outer surface being complemental to the bore in said chamber, the exterior of said separator and said bore being smaller adjacent to the outlet end of the chamber than elsewhere, said chamber and separator having cooperating surfaces which form enclosed longitudinally extending channels spaced by intermediate longitudinal fins, said channels providing passageways for material to be molded.

2. In an injection molding device, a heating chamber having a bore therein, a separator in said chamber having a tapered outer surface, the included angle of said outer surface being less than 15° and said outer surface being complemental to the bore in said chamber, the exterior of said separator and said bore being smaller adjacent to the outlet end of the chamber than elsewhere, said chamber and separator having cooperating surfaces which form enclosed longitudinally extending channels spaced by intermediate longitudinal fins, said channels providing passageways for material to be molded, the bottoms of said channels being parallel to the longitudinal axis of the separator.

3. In an injection molding device, a heating chamber having a bore therein, a separator in said chamber having a tapered outer surface, the included angle of said outer surface being less than 15° and said outer surface being complemental to the bore in said chamber, the exterior of said separator and said bore being smaller adjacent to the outlet end of the chamber than elsewhere, said chamber and separator having cooperating surfaces which form enclosed longitudinally extending channels spaced by intermediate longitudinal fins, said channels providing passageways for material to be molded, the bottoms of said channels being parallel to the longitudinal axis of the separator and said channels being of substantially equal width throughout their length.

4. In an injection molding device, a heating chamber having a bore therein, a separator in said chamber having a tapered outer surface, the included angle of said outer surface being less than 15° and said outer surface being complemental to the bore in said chamber, the exterior of said separator and said bore being smaller adjacent to the outlet end of the chamber than elsewhere, said chamber and separator having cooperating surfaces which form enclosed longitudinally extending channels spaced by intermediate longitudinal fins, said channels providing passageways for material to be molded and said channels being of substantially equal width throughout their length.

5. A separator adapted for frictionally gripped engagement in the heating chamber of a molding device having a bore tapered convergently toward the outlet end of the chamber, said separator having a conically tapered external surface and longitudinal channels formed in its external portion, the included angle between opposite elements of the conical surfaces being less than 15°, the bottoms of the channels being parallel to the longitudinal axis of the separator.

6. A separator adapted for frictionally gripped engagement in the heating chamber of a molding device having a bore tapered convergently toward the outlet end of the chamber, said separator having a conically tapered external surface and longitudinal channels formed in its external portion, the included angle between opposite elements of the conical surfaces being less than 15°, the bottoms of the channels being parallel to the longitudinal axis of the separator and said channels being of substantially equal width throughou their length.

CLARENCE W. BURNHAM.

REFERENCES CITED

The following references are of record in the file of this patent:

UNITED STATES PATENTS

| Number | Name | Date |
| --- | --- | --- |
| 2,253,627 | Knowles | Aug. 26, 1941 |
| 2,373,939 | Bailey | Apr. 17, 1945 |